(12) United States Patent
McCaslin et al.

(10) Patent No.: US 9,159,343 B2
(45) Date of Patent: Oct. 13, 2015

(54) COPPER RESIDUAL STRESS RELAXATION REDUCTION MEANS FOR HARD DISK DRIVE SLIDER GIMBALS

(71) Applicant: NITTO DENKO CORPORATION, Ibaraki-shi, Osaka (JP)

(72) Inventors: Martin John McCaslin, Pleasanton, CA (US); Visit Thaveeprungsriporn, Bangkok (TH); Alex Enriquez Cayaban, Fremont, CA (US); Jason Aquinde Gomez, Santa Clara, CA (US)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/250,836

(22) Filed: Apr. 11, 2014

(65) Prior Publication Data
US 2014/0285926 A1    Sep. 25, 2014

Related U.S. Application Data

(62) Division of application No. 12/495,323, filed on Jun. 30, 2009, now abandoned.

(60) Provisional application No. 61/091,323, filed on Aug. 22, 2008.

(51) Int. Cl.
    *G11B 5/48* (2006.01)
(52) U.S. Cl.
    CPC ............ *G11B 5/4833* (2013.01); *G11B 5/4826* (2013.01); *G11B 5/4853* (2013.01)
(58) Field of Classification Search
    CPC .. G11B 5/4826; G11B 5/4833; G11B 5/4853; G11B 5/486

USPC ............................................ 360/245.3, 245.9
See application file for complete search history.

(56) References Cited

U.S. PATENT DOCUMENTS

| 6,046,887 A | 4/2000 | Uozumi et al. |
| 6,125,015 A * | 9/2000 | Carlson et al. ............. 360/245.9 |

(Continued)

FOREIGN PATENT DOCUMENTS

| JP | 63138618 A | 12/1989 |
| JP | 11039626 | 2/1999 |

(Continued)

OTHER PUBLICATIONS

Non-Final Office Action issued in U.S. Appl. No. 13/481,530 dated Aug. 30, 2012.

(Continued)

*Primary Examiner* — Will J Klimowicz
(74) *Attorney, Agent, or Firm* — Sughrue Mion, PLLC

(57) ABSTRACT

A hard drive gimbal trace circuit includes: a stainless steel gimbal strut (SGST) configured to support a transducer and nullify a natural pitch angle of a flexure from mechanical-coarse adjustment of the SGST; traces forming a trace structure, and being plastically deformed at a high strain region from the mechanical-coarse adjustment of the SGST; and a first protrusion and a second protrusion being at least partially disposed under the high strain region. The SGST has an edge which is disposed on the transducer side to be spaced apart from the traces in the high strain region and extends substantially parallel to the traces. The first protrusion and the second protrusion extend from the edge in an orthogonal direction to an extending direction of the traces and across the traces, and are disposed side by side in the extending direction of the traces.

9 Claims, 16 Drawing Sheets

(56) References Cited

U.S. PATENT DOCUMENTS

| | | | |
|---|---|---|---|
| 6,146,813 | A | 11/2000 | Girard et al. |
| 6,249,404 | B1 | 6/2001 | Doundakov et al. |
| 6,515,832 | B1 | 2/2003 | Girard |
| 6,596,184 | B1 | 7/2003 | Shum et al. |
| 6,697,228 | B1 | 2/2004 | Mei et al. |
| 6,741,426 | B2 | 5/2004 | Girard |
| 6,992,862 | B2 | 1/2006 | Childers |
| 6,993,824 | B2 | 2/2006 | Childers et al. |
| 7,349,184 | B2 | 3/2008 | Erpelding |
| 7,468,866 | B2 | 12/2008 | Yang et al. |
| 7,532,438 | B1 * | 5/2009 | Mei et al. ............ 360/245.8 |
| 7,567,410 | B1 | 7/2009 | Zhang et al. |
| 7,667,930 | B1 * | 2/2010 | Wang .................. 360/245.3 |
| 7,684,154 | B2 | 3/2010 | Zeng et al. |
| 7,701,673 | B2 | 4/2010 | Wang et al. |
| 7,733,607 | B2 | 6/2010 | Yao et al. |
| 7,898,772 | B1 | 3/2011 | Ziaei et al. |
| 8,085,508 | B2 | 12/2011 | Hatch |
| 8,089,731 | B1 | 1/2012 | Ma et al. |
| 8,159,786 | B2 | 4/2012 | Yao et al. |
| 8,218,269 | B2 | 7/2012 | Zeng et al. |
| 8,441,761 | B1 * | 5/2013 | Hahn et al. ........... 360/245.9 |
| 8,570,687 | B2 * | 10/2013 | McCaslin et al. ..... 360/245.9 |
| 8,711,521 | B2 * | 4/2014 | Feng et al. ............ 360/241.3 |
| 8,792,213 | B1 * | 7/2014 | Vijay et al. ............ 360/245.3 |
| 2004/0181932 | A1 | 9/2004 | Yao et al. |
| 2004/0240115 | A1 | 12/2004 | Hutchinson et al. |
| 2005/0117257 | A1 | 6/2005 | Thaveeprungsriporn et al. |
| 2005/0248885 | A1 | 11/2005 | Funada et al. |
| 2005/0280944 | A1 | 12/2005 | Yang et al. |
| 2006/0262456 | A1 | 11/2006 | Wang et al. |
| 2006/0291102 | A1 | 12/2006 | Honda |
| 2008/0030900 | A1 | 2/2008 | Zeng et al. |
| 2008/0030903 | A1 | 2/2008 | Feng |
| 2008/0049361 | A1 | 2/2008 | Kushima et al. |
| 2008/0123221 | A1 | 5/2008 | Zeng et al. |
| 2008/0180850 | A1 | 7/2008 | Rice et al. |
| 2009/0207529 | A1 | 8/2009 | Yao |
| 2009/0244786 | A1 | 10/2009 | Hatch |
| 2011/0299196 | A1 | 12/2011 | Zeng et al. |

FOREIGN PATENT DOCUMENTS

| | | |
|---|---|---|
| JP | 2005115973 | 4/2005 |
| JP | 2005322336 | 11/2005 |
| JP | 2007012111 | 1/2007 |
| JP | 200841215 | 2/2008 |
| JP | 2008135163 | 6/2008 |

OTHER PUBLICATIONS

Chinese Office Action dated Nov. 22, 2012 issued in corresponding Chinese Patent Application No. 200910162385.0.

US Final Office Action issued in U.S. Appl. No. 13/481,530 dated Jan. 28, 2013.

Notification for Reasons of Refusal in Japanese Patent Application No. 2009-187747 dated Jan. 10, 2012.

* cited by examiner

FIG. 6C
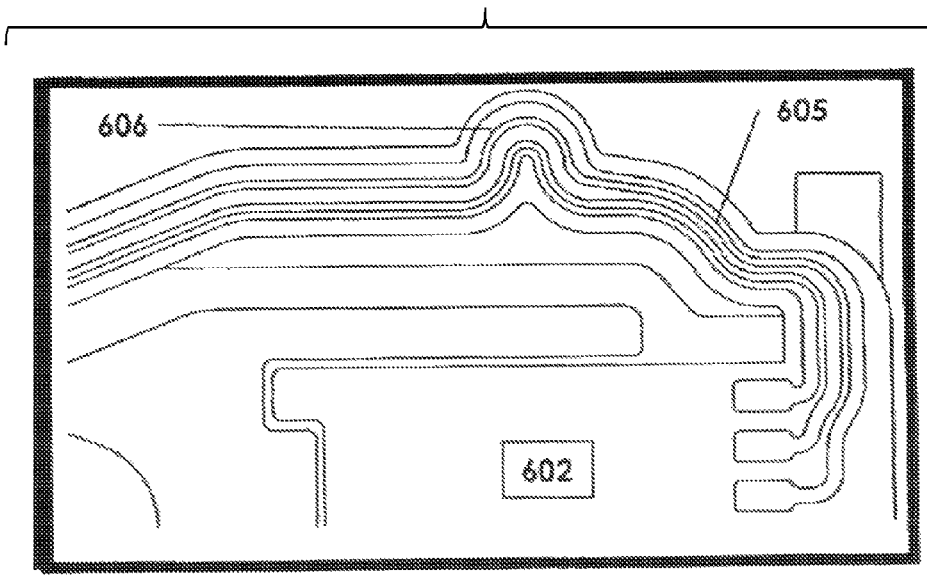
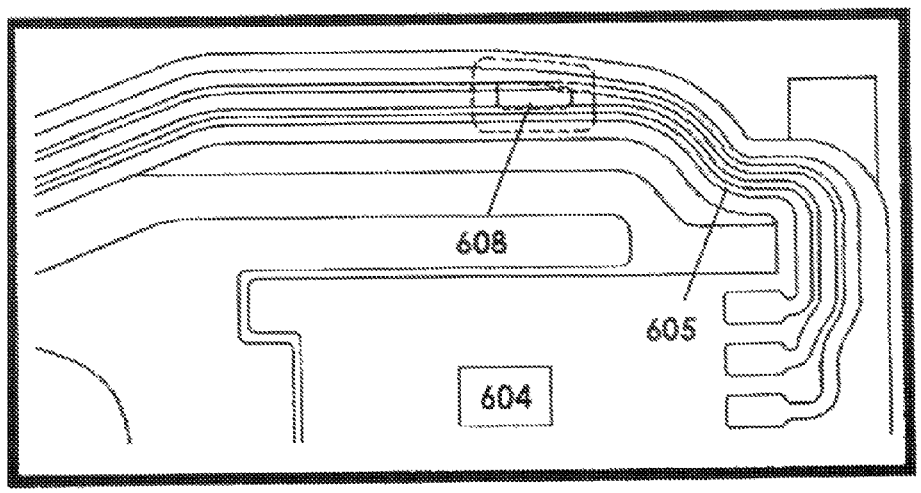

FIG. 7C
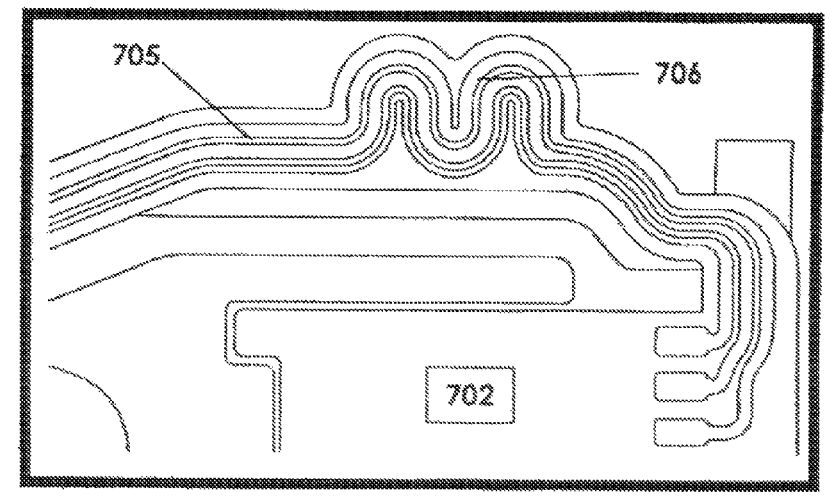
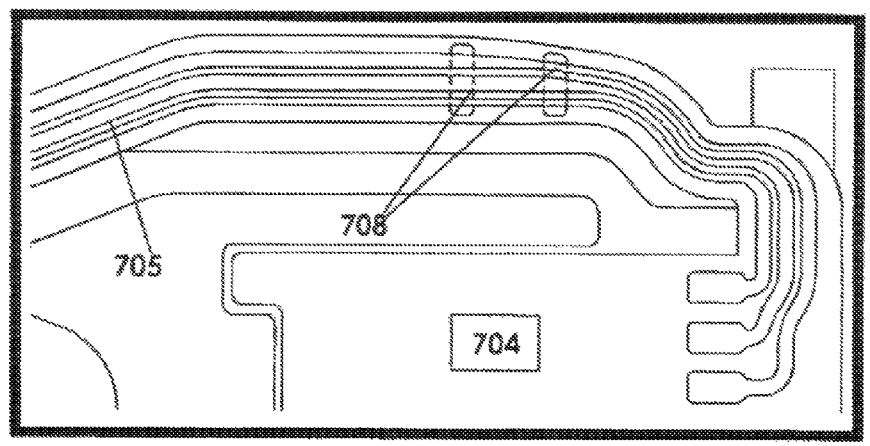

COPPER RESIDUAL STRESS RELAXATION REDUCTION MEANS FOR HARD DISK DRIVE SLIDER GIMBALS

CROSS-REFERENCE TO RELATED APPLICATIONS

This is a division of application Ser. No. 12/495,323 filed Jun. 30, 2009, which claims the benefit of priority to U.S. Provisional Patent Application No. 61/091,323 filed Aug. 22, 2008, the disclosures of which are incorporated herein by reference in their entireties.

DESCRIPTION OF THE INVENTION

1. Field of the Invention

This invention generally relates to Hard Disk Drive design engineering and process optimization and more specifically to copper residual stress relaxation reduction for Hard Disk Drive slider gimbals.

2. Description of the Related Art

Hard Disk Drives (HDD) are normally utilized as data storage units in various computer and consumer electronics applications. Generally, HDDs operate by reading and writing digitized information onto multiple stacked rotating magnetic disks. This reading and writing is accomplished by a magnetic transducer "head" embedded on a "slider", made typically of Aluminum-Titanium Carbon, (ALTIC), which is mounted on a "suspension".

The read/write head assembly typically incorporates an electromagnetic transducer flown by an air bearing slider. This slider operates in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions. The entire structure of the slider and suspension is usually called the head gimbal assembly (HGA). In a typical design, the gimbal may include stainless steel gimbal struts with an attached flexible gimbal circuit board, composed of a polyimide layer and a copper layer, for carrying the electrical signals to and from the electromagnetic transducer.

In a typical HDD, the consistent fly height of the electromagnetic transducer over the surface of the magnetic disk drive is very important for long-term reliability of the data read and write operations of the HDD. On the other hand, residual stress in the copper layer of the suspension gimbal circuit board of an HDD can lead to long term drift in the pitch static attitude of the gimbal, adversely effecting the electromagnetic transducer fly height over the surface of the magnetic disk. This, in turn, adversely affects the reliability of the read/write operations performed by the HDD.

Thus, new ways for reducing the magnitude of the residual stress or residual plastic strain in HDD gimbal circuit boards are needed.

SUMMARY OF THE INVENTION

The inventive concept is directed to methods and systems that substantially obviate one or more of the above and other problems associated with conventional technology associated with instability in pitch attitude of the gimbal over time, temperature and handling processes, including ultrasonic cleaning.

One or more embodiments of the invention can provide reduction means for the magnitude of the residual stress in the HDD gimbal circuits, or more specifically, the residual plastic strain.

In accordance with an aspect of the inventive concept, there is provided a hard drive (HDD) gimbal trace circuit characterized in reduced magnitude of the residual stress or residual plastic strain. The inventive trace circuit including a plurality of traces, the plurality of traces forming a trace structure and a strut configured to support a transducer. In the inventive circuit, the trace structure has, in a proximity of a high strain region, a characteristic shape selected from a group consisting of an outward circle shape, a double outward circle shape, a waving and narrowing shape, an outward jog, a partial outward jog with a slot, a dual jog, and an inner trace overlap.

In accordance with another aspect of the inventive concept, there is provided a hard drive (HDD) gimbal trace circuit characterized in reduced magnitude of the residual stress or residual plastic strain. The inventive trace circuit including a plurality of traces, the plurality of traces forming a trace structure; and a strut configured to support a transducer. In the inventive circuit, the traces in the trace structure are either narrowed or widened in a proximity of a high strain region.

In accordance with yet another aspect of the inventive concept, there is provided a hard drive (HDD) having a gimbal trace circuit characterized in reduced magnitude of the residual stress or residual plastic strain. The inventive trace circuit includes a plurality of traces, the plurality of traces forming a trace structure; a strut configured to support a transducer; and at least one stress suppressor. In the inventive circuit, the at least one stress suppressor is either a protrusion of the strut or an island structure, the stress suppressor being disposed under the plurality of traces in a proximity of a high strain region.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIGS. 6B and 6C illustrate an embodiment of the present invention with traces routed to circle outwards in order to reduce the residual plastic strain component, an embodiment with traces narrowed in order to reduce the residual plastic strain component, and an embodiment of this invention with a SST support member strategically located under the traces in order to reduce the residual plastic strain component.

FIGS. 7B and 7C illustrate an embodiment of the present invention with traces routed to circle outwards twice, in order to reduce the residual plastic strain component, an embodiment of the present invention with traces narrowed and with wave shapes in order to reduce the residual plastic strain component, and an embodiment of this invention with two SST support members strategically located under the traces in order to reduce the residual plastic strain component.

DETAILED DESCRIPTION

In the following detailed description, reference will be made to the accompanying drawing(s), in which identical functional elements are designated with like names. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

One of the aspects of the present invention is directed towards overcoming instability in pitch attitude of the HDD gimbal over time, temperature and handling. The aforesaid instability in the pitch attitude of the HDD gimbal results in the instability of the electromagnetic transducer fly height over the surface of the magnetic disk and, consequently, reduced reliability of the read/write operations performed by the HDD. Accordingly, achieving the aforesaid stability in the gimbal pitch attitude is crucial to improving the performance reliability of the HDD.

In accordance with an embodiment of the inventive concept, a simulation method for stress relaxation was developed, which has been used to uncover the specific location of the plastic strain in the structure of the gimbal circuit board. Subsequently, several ways were conceived to circumvent the plastic strain by design of the geometry locally, opening the design space to include changes in any or all the polyimide, copper and stainless steel layers forming the gimbal. Third, the aforesaid simulation tool was exercised to discover which gimbal design solutions are most effective for overcoming the residual stress problem. This resulted in the gimbal designs most effective for overcoming the residual stress condition. The results are described below with reference to the specific exemplary embodiments of the improved gimbal configuration and illustrated in the accompanying drawings.

Using one or more of the aspects of the invention, the effects of the residual stress problem can be reduced and a more consistent and stable fly height of the slider and Read/Write transducer can be realized. Also, because pitch static attitude of the gimbal is a frequently measured (inspected) parameter, the manufacturing yields of the HDDs can be improved due to the inherent improved stability of the gimbal assembly.

Figure 1:
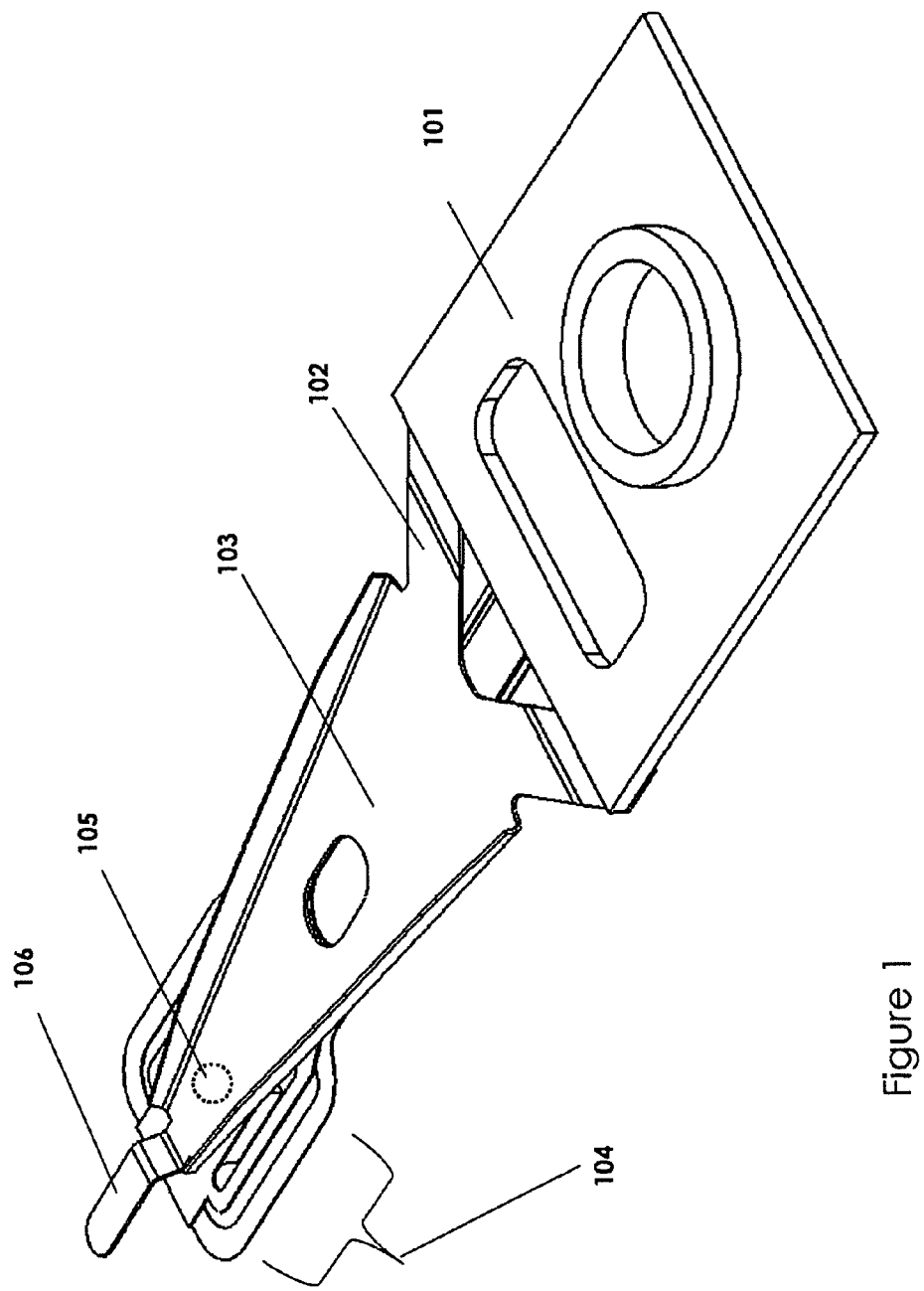
FIG. 1 illustrates exemplary components of a disk drive suspension viewed from above of the actuator arm.

FIG. 1 illustrates the exemplary components of a hard disk drive suspension viewed from above of the actuator arm. The transducer (not shown) is facing downward and hidden in this view. Typical constructions of the suspension include four components: baseplate 101, hinge 102, loadbeam 103 and trace/gimbal (or flexure circuit) 104. Some designs involve three component constructions, as shown, combining the hinge and loadbeam into one component. Such constructions can also include a load beam dimple with a dome protrusion downward 105, and a lift tab 106.

Figure 2:
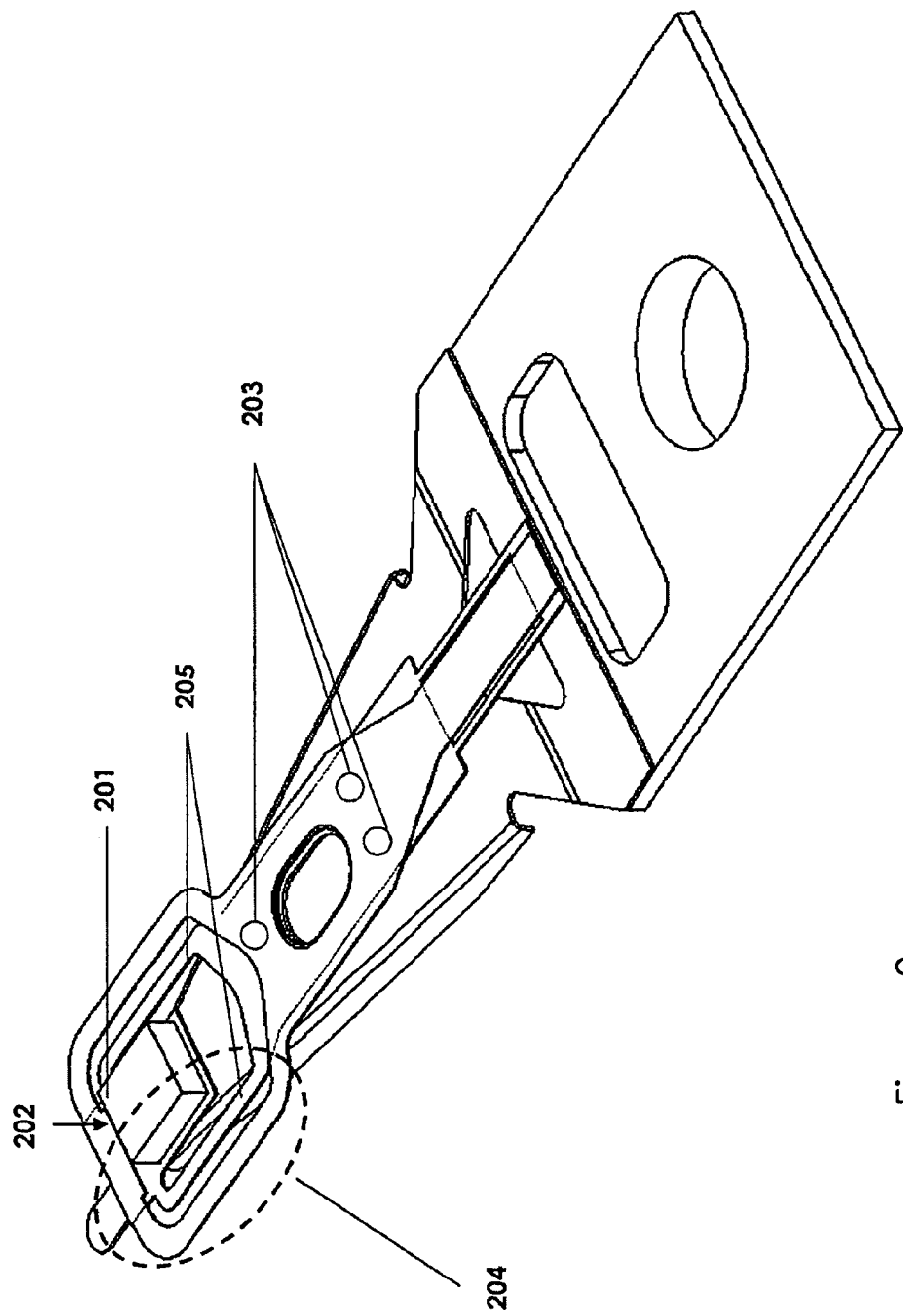
FIG. 2 illustrates the components of a disk drive suspension viewed from the surface of the magnetic disk drive.

FIG. 2 illustrates the components of a hard disk drive suspension as viewed from the surface of the magnetic disk. The slider 201 will house the read/write transducers at the trailing edge 202 of the Air Bearing Surface (ABS). Flexure welds 203 attached the circuit board to the loadbeam 103. The dotted line 204 and the gimbal struts 205 (preferably made of stainless steel) signify the region of focus for the various embodiments of the present invention.

Figure 3:
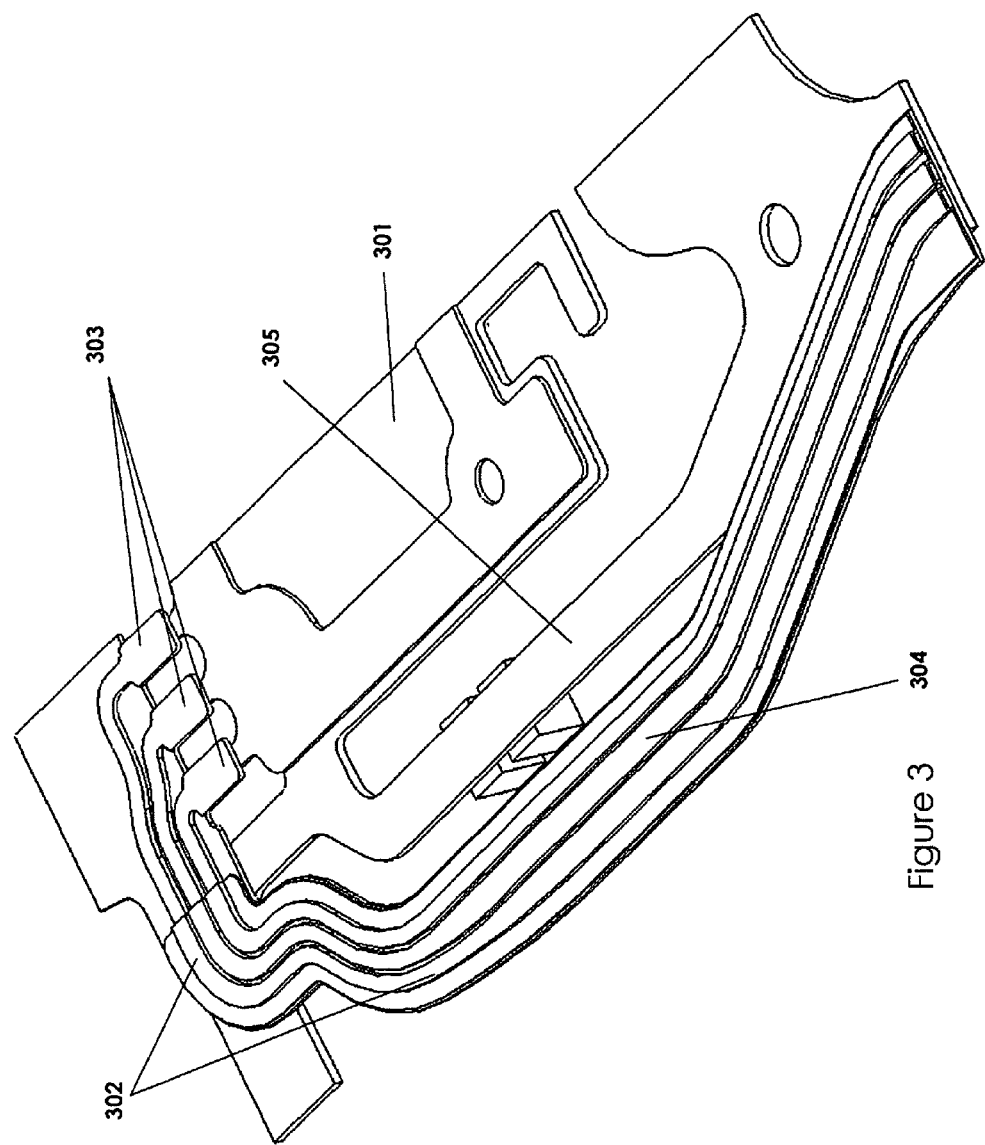
FIG. 3 illustrates a half symmetry model locally of the flexure tongue, copper trace circuit and SST struts, which provide the major portion of the gimbal stiffness.

FIG. 3 illustrates a half symmetry model locally of the flexure tongue 301, copper trace circuit with supporting polyimide struts 304 and SST struts 305, which provide the major contribution to the overall stiffness of the gimbal. Exposed copper pads and traces 303 accept solder connections to the slider/head (not shown). A polyimide coverlayer 302 on top of the copper traces exists for protection purposes.

Figure 4:
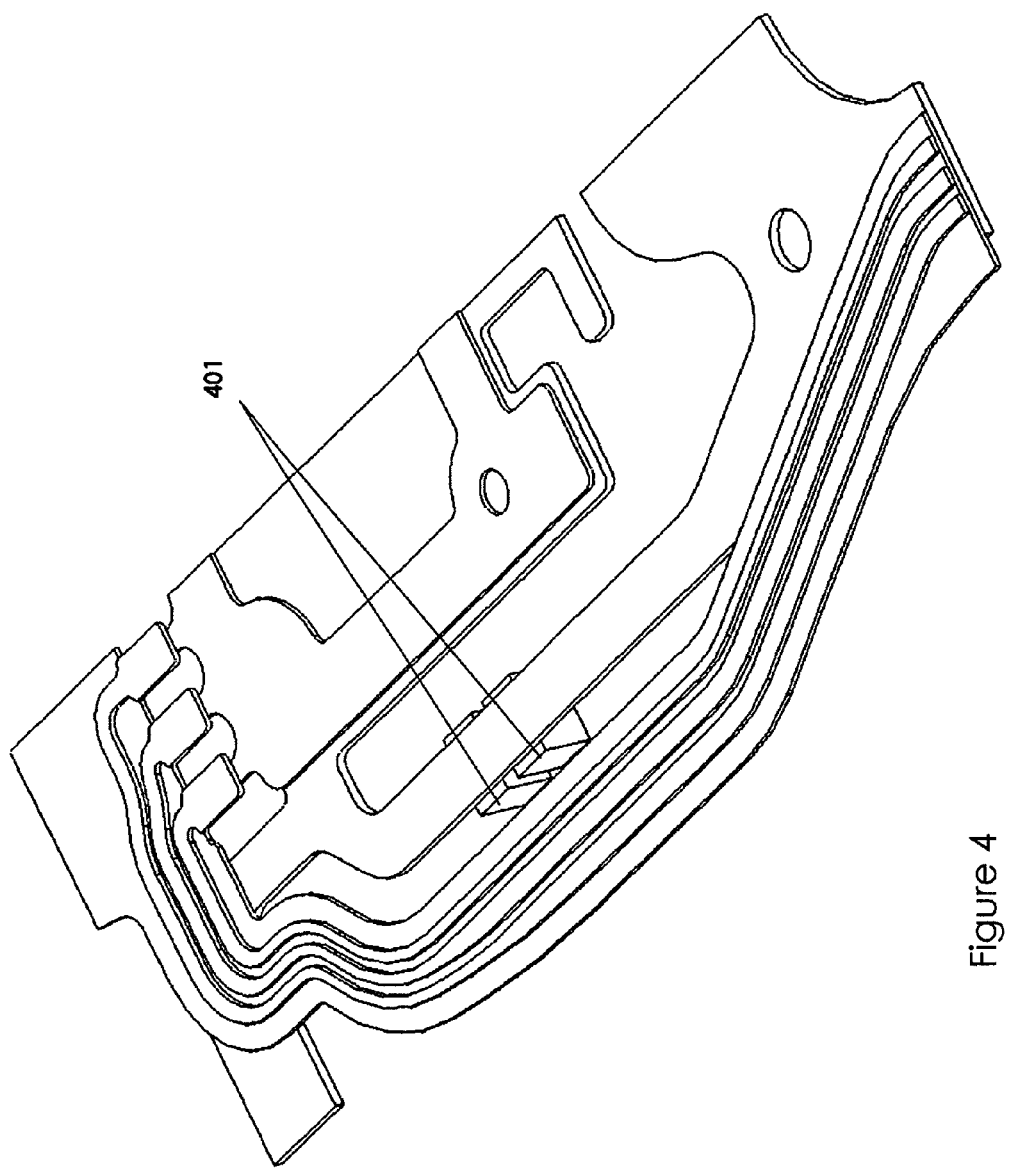
FIG. 4 illustrates the same structure as FIG. 3, except the protective coverlayer is hidden.

FIG. 4 illustrates the same structure as FIG. 3 except the coverlayer is hidden. Also depicted are forming jigs 401 that are used for simulation of the mechanical adjust process and necessary because of the finite dimple height. The gimbal flexure tongue is spaced off the load beam, in an angular fashion, by an amount equal to the dimple height, typically 50 to 70 microns. This defines the natural pitch angle of the flexure tongue, to which the slider bonds to. One of the forming jigs 401, is fixed, while the other rotates in order to permanently bend the SST strut 305 in FIG. 3.

Figure 5:
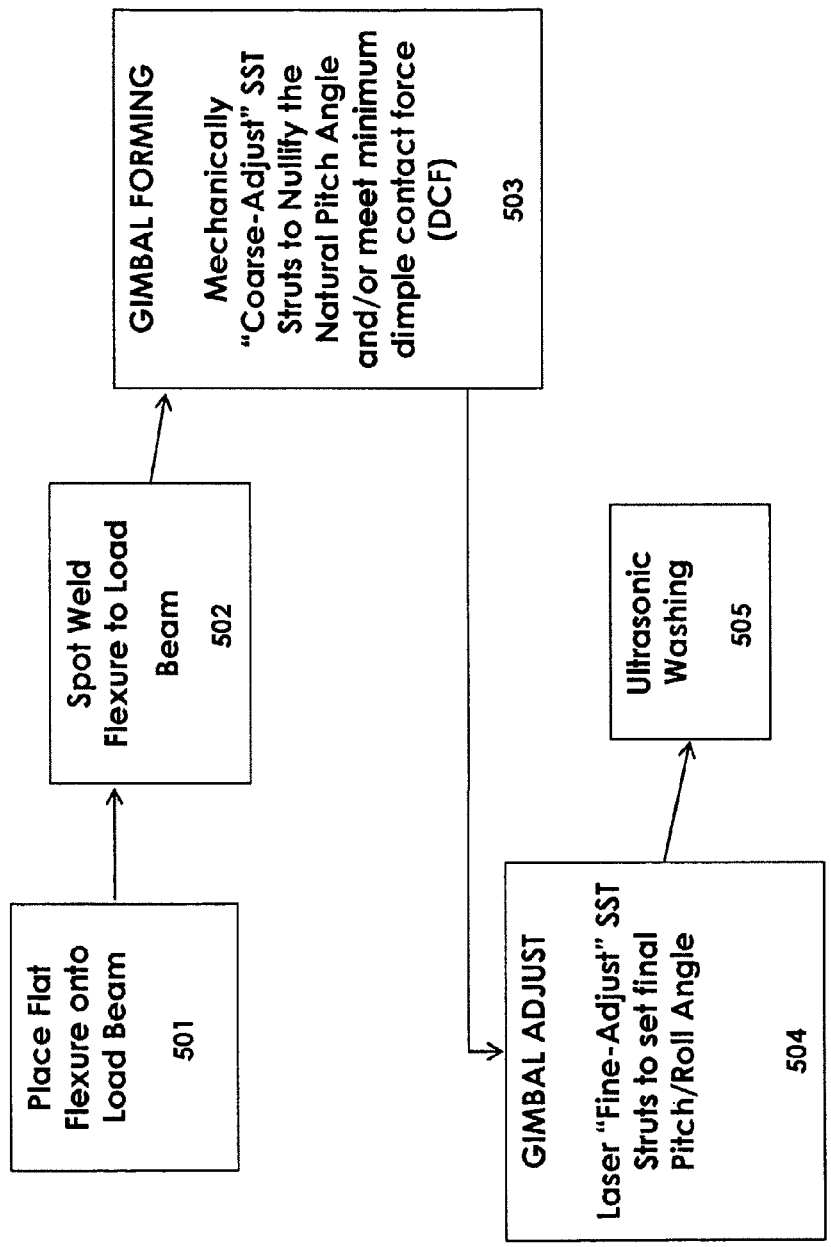
FIG. 5 illustrates the related necessary process steps for the suspension assembly, at least one of which, can result in copper trace plastic deformation.

FIG. 5 illustrates the related necessary process steps for the suspension assembly that result in copper trace plastic deformation. First, a flat flexure is placed onto a load beam 501. During this step, the flexure tongue will experience a natural pitch angle. The flexure is then spot welded to the load beam 502. The SST struts are then mechanically coarse-adjusted to nullify the natural pitch angle 503, and the copper will exhibit some permanent plastic behavior. Lasers fine-adjust the SST struts in order to set the final, optimal pitch/roll angle 504, wherein the residual copper stress/strain prevails. The pitch and roll static attitude (PSA/RSA) from this step onward must be stable with regards to handling, temperature and time. Subsequently, the flexure is subject to ultrasonic washing 505.

Very local plastic strain behavior of the gimbal results from the mechanical forming of the SST struts. The simulation details for studying this behavior are beyond the scope of this specification. The Finite Element Model (FEM) of the mechanical gimbal forming process nullifies the natural pitch angle. The object is to make the pitch angle relaxation less sensitive to the geometry of the local region.

The basic idea to reduce copper contribution to PSA stability is outlined by the process as follows. First, the location of copper plastic deformation is learned thru simulation. The traces are then thinned or widened locally, depending on the circumstances. Subsequently, the traces may need alternate routing to either an outer loop or into other shapes in order to reduce plastic behavior in the copper.

When examined, the plastic component of the strain is non-elastic, and results in a finite residual strain component contributing to undesirable pitch angle relaxation versus handling, ultrasonic cleaning, temperature and time.

Figure 6A:
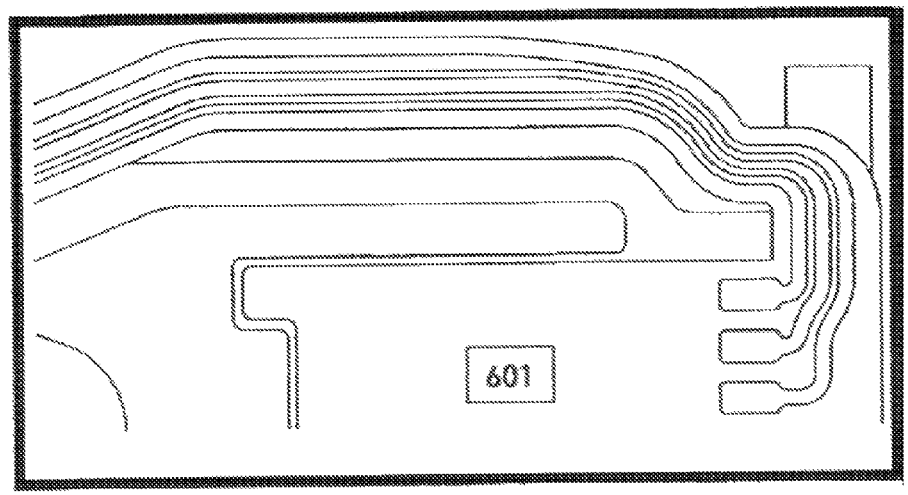
FIG. 6A illustrates a typical conventional construction of outrigger trace circuit and SST strut.
Figure 6B:
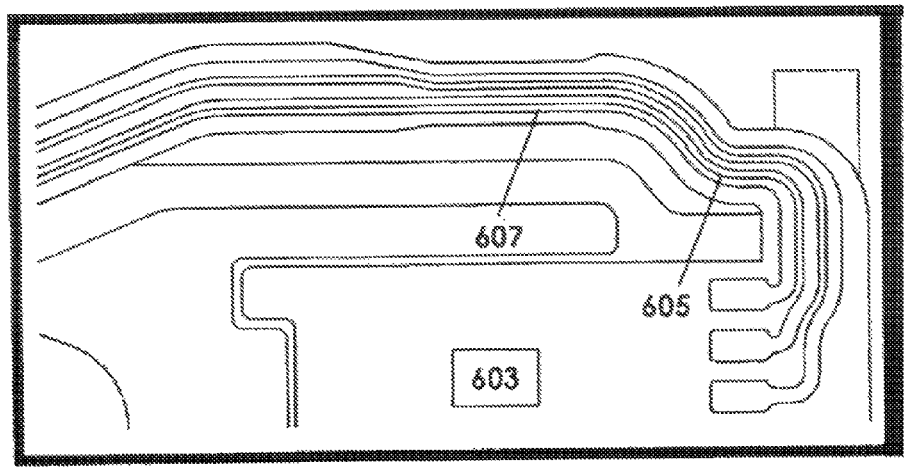

FIG. 6A illustrates a typical conventional construction 601 of outrigger trace circuit and SST strut. FIG. 6B illustrates an embodiment 603 with traces 605 narrowed 607 in order to reduce the copper residual plastic strain component. FIG. 6C illustrates an embodiment of the present invention 602 with traces 605 routed to circle outwards 606 in order to reduce the copper residual plastic strain component, and an embodiment of this invention 604 with a SST support member strategically located under 608 the traces 605 in order to reduce the residual plastic strain component. These constructions are shown as an example, but should not limit the scope of materials that could be employed, or shapes that are possible in the spirit of this invention. These constructions may be implemented individually, or conjunction with each other in many combinations.

Figure 7A:
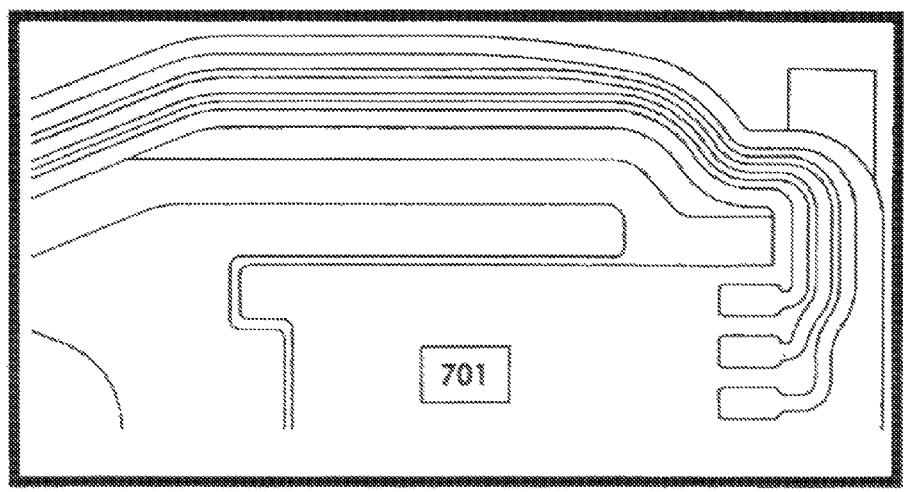
FIG. 7A illustrates a typical conventional construction of outrigger trace circuit and SST strut.
Figure 7B:
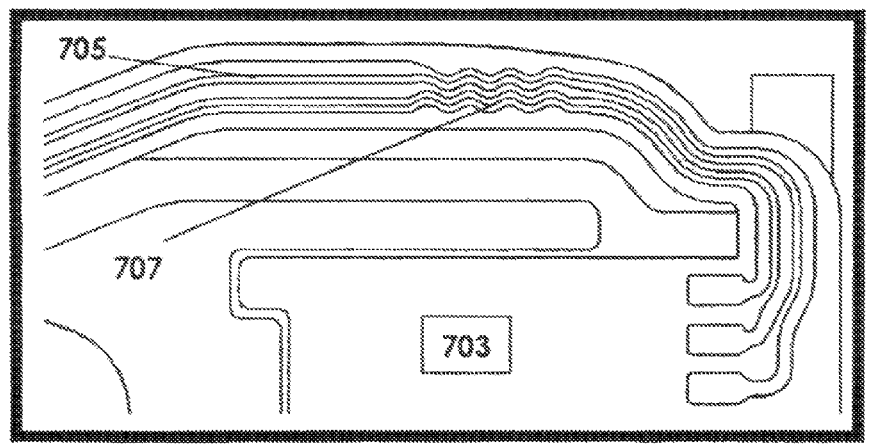

FIG. 7A illustrates a typical conventional construction 701 of outrigger trace circuit and SST strut. FIG. 7B illustrates an embodiment of the present invention 703 with traces 705 narrowed and with wave shapes 707 in order to reduce the copper residual plastic strain component. FIG. 7C illustrates an embodiment of the present invention 702 with traces routed to circle outwards twice in order to reduce the residual plastic strain component, and an embodiment of this invention 704 with two SST support members 708 strategically located under the traces 705 in order to reduce the copper residual plastic strain component.

Figure 8A:
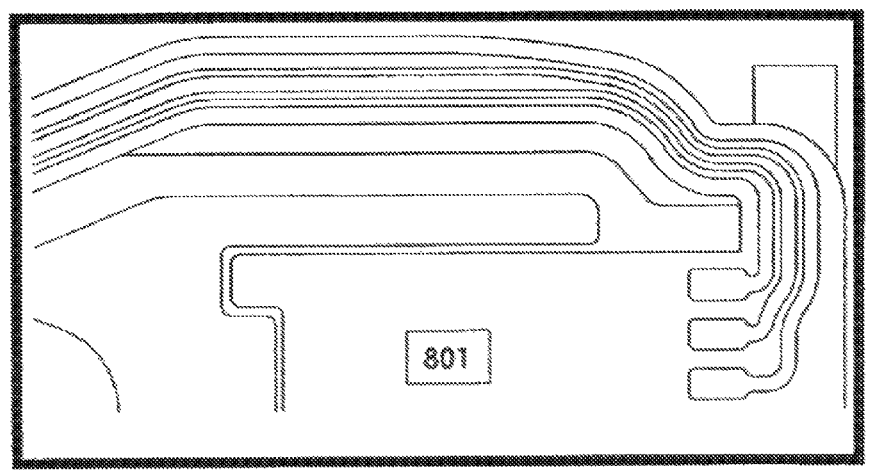
FIG. 8A illustrates a typical conventional construction of outrigger trace circuit and SST strut.
Figure 8B:
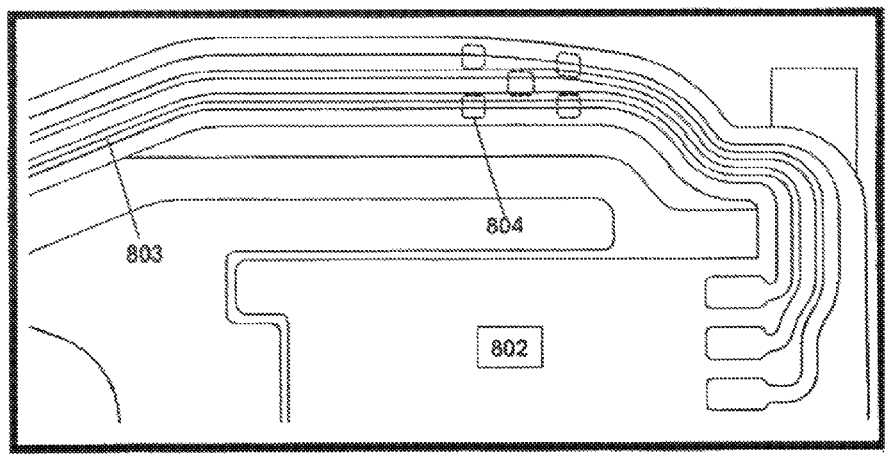
FIG. 8B illustrates an embodiment of this invention with five SST support members strategically located under the traces in order to reduce the residual plastic strain component.

FIG. 8A illustrates a typical conventional construction of outrigger trace circuit and SST strut 801. FIG. 8B illustrates an embodiment of the present invention 802 with five SST support members 804 strategically located under the traces 803 in order to reduce the residual plastic strain component. Any number of SST islands located under the copper high strain region, for example 4, 5, 6, or more, would be consistent within the concepts and spirit of various embodiments of the present invention.

Figure 9A:
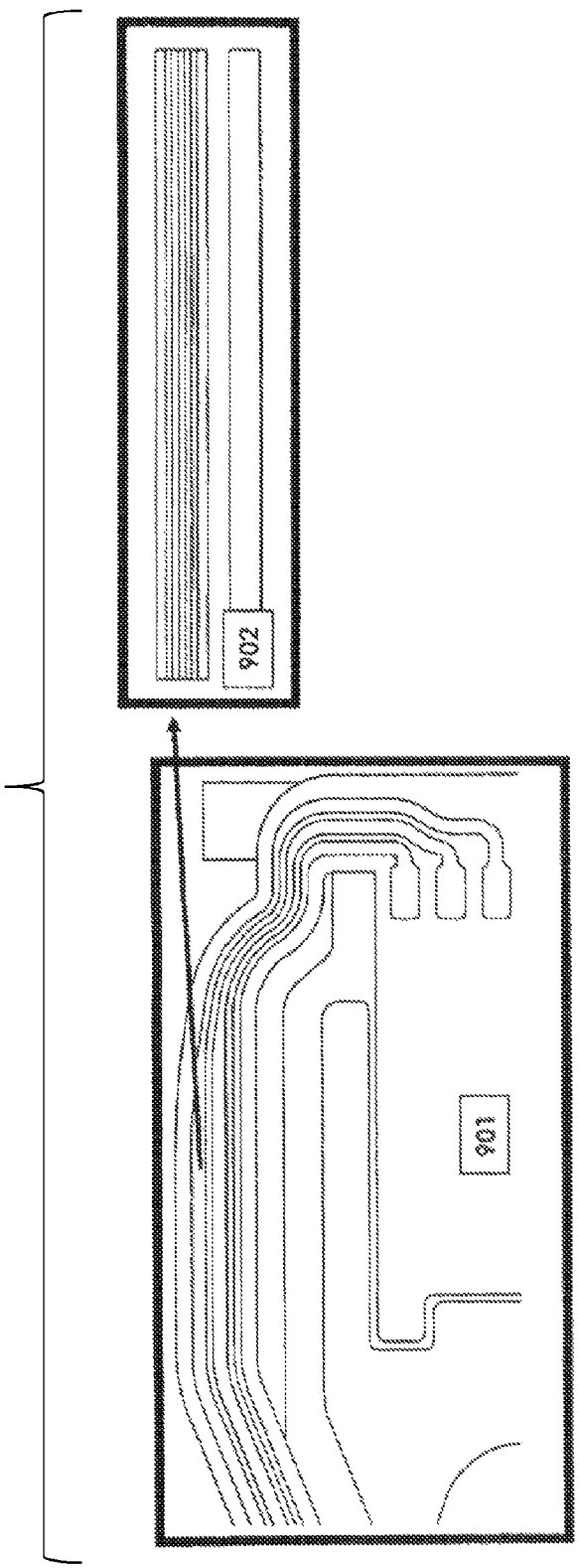
FIG. 9A illustrates a conventional construction of outrigger trace circuit and SST strut.
Figure 9B:
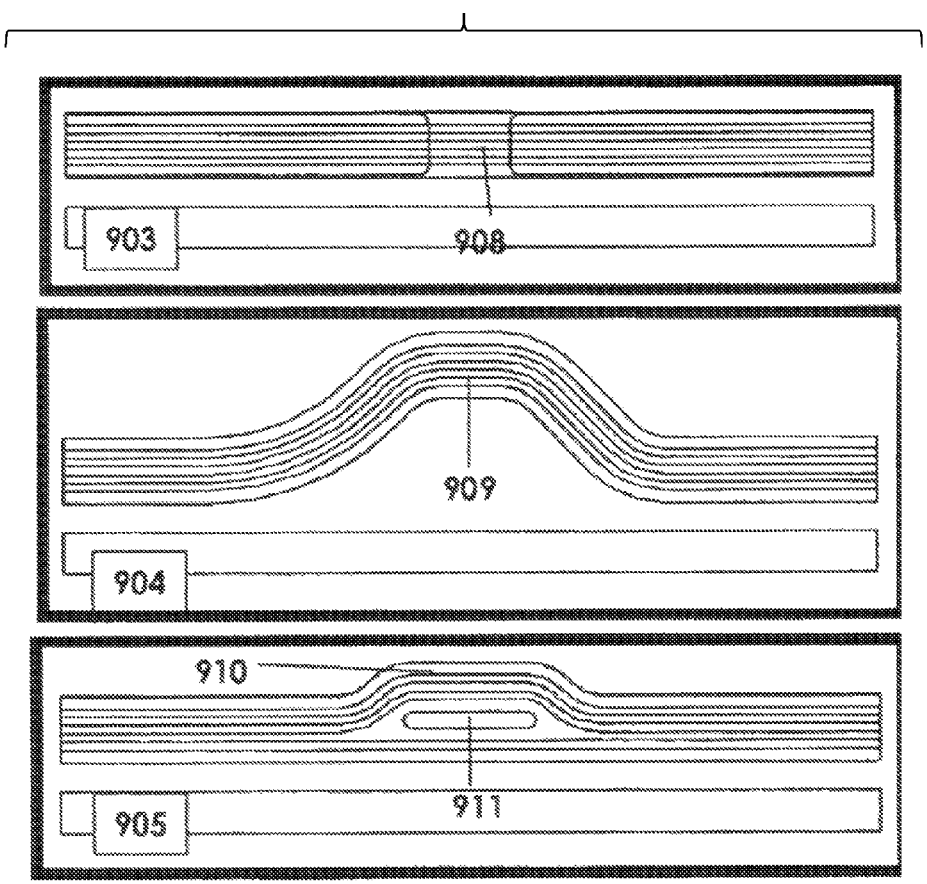
FIGS. 9B and 9C illustrate an exemplary embodiment of various outrigger trace circuits with SST struts.
Figure 9C:
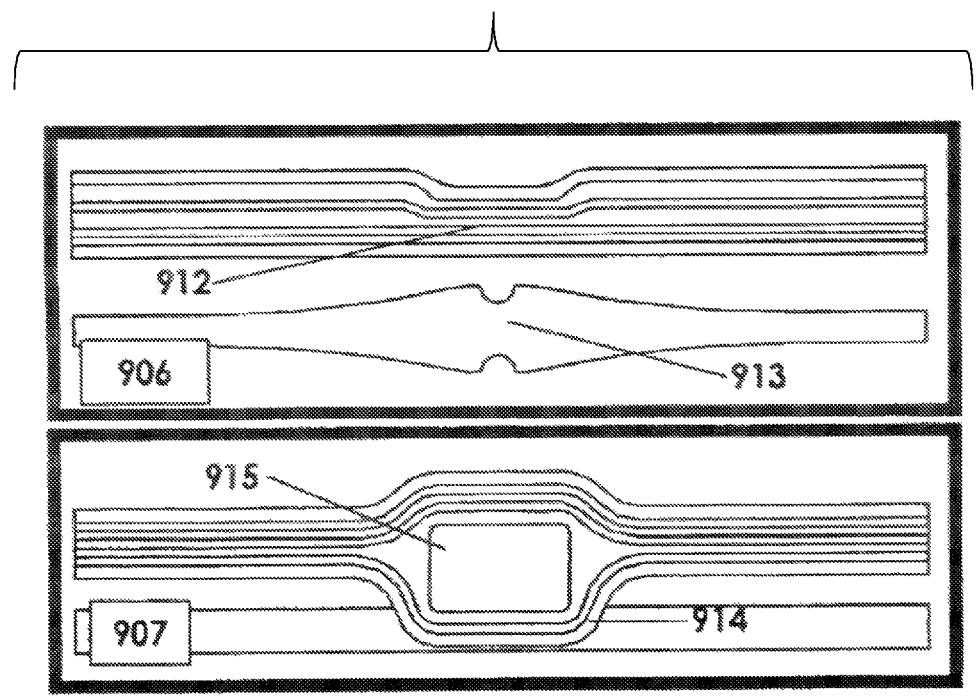

FIGS. 9A, 9B, and 9C illustrate various outrigger trace circuit configurations with SST struts. Configuration 901 shows a typical conventional construction of outrigger trace circuit and SST strut. Configuration 902 shows a typical conventional construction of outrigger trace circuit and SST strut, but a more simplified view. Configuration 903 illustrates an embodiment of the present invention with a coverlayer opening window 908 in order to reduce the residual plastic strain component. Configuration 904 illustrates an embodiment of the present invention with traces routed in a jog outward 909 in order to reduce the copper residual plastic strain component. Configuration 905 illustrates an embodiment of the present invention with some traces routed in a jog outward 910 to reduce the copper residual plastic strain component. A polyimide layer 911 window acts to separate these traces from the inner trace. Configuration 906 illustrates an embodiment of the present invention with traces narrowed 912 in order to reduce the copper residual plastic strain component. The SST strut 913, as shown, can also be widened and tapered to a narrower dimension. Configuration 907 illustrates an embodiment of this invention with some traces routed in a jog outward, but internal trace routes inward 914 onto the SST strut in order to reduce the copper residual plastic strain component. A polyimide layer window 915 acts to separate these traces from the inner trace.

Figure 10:
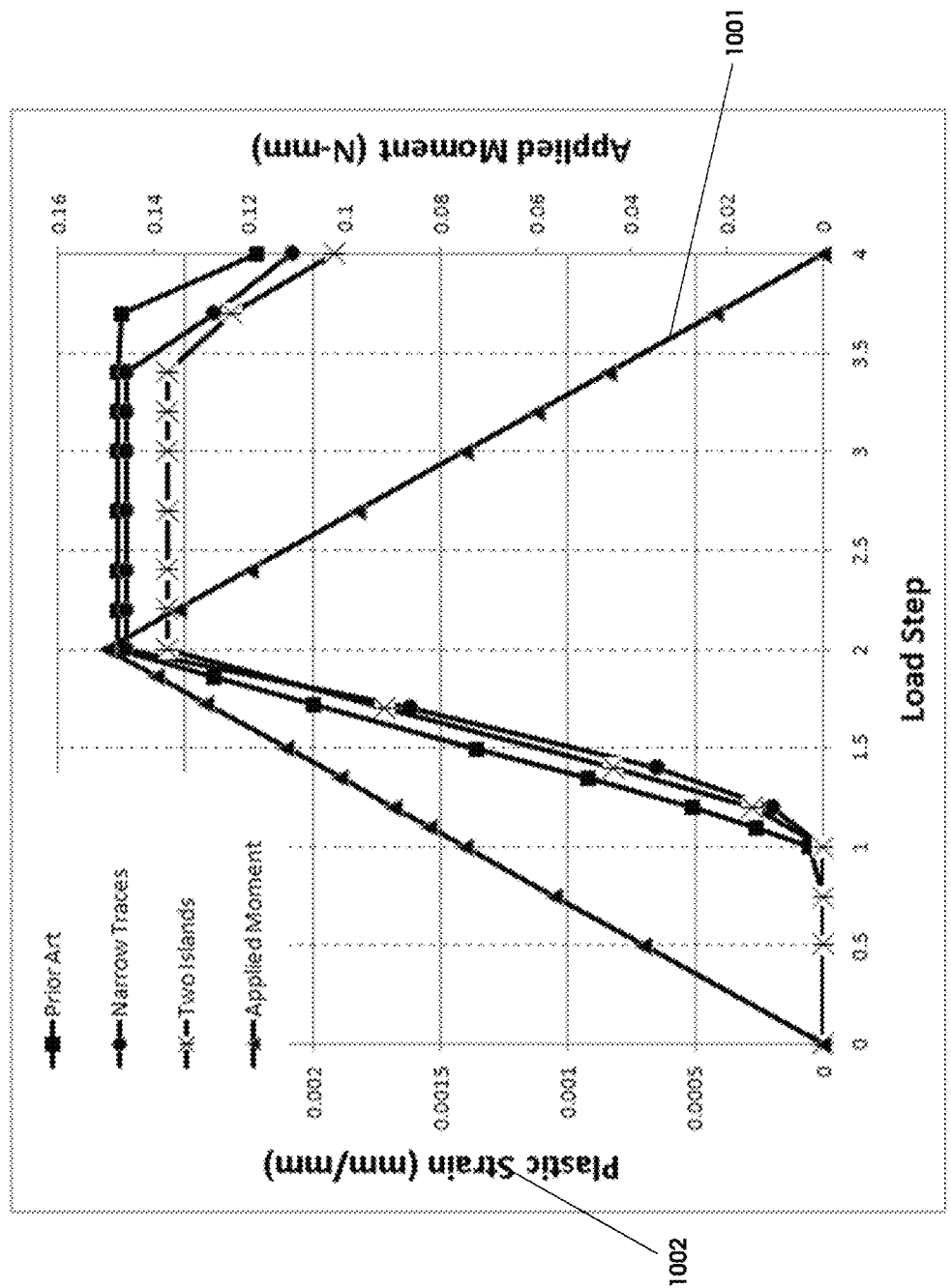
FIG. 10 illustrates various FEM results for plastic strain versus applied SST strut forming moment.

FIG. 10 illustrates various FEM results for plastic strain versus applied SST strut forming moment. The right hand y-axis depicts the magnitude of the applied moment in a 4 step time sequence. Jigs 401 of FIG. 4 are the recipient of this moment loading and the solid line depicted with triangles 1001 illustrates that this moment is ramped from zero, up to a value, and back to zero. The left hand y-axis 1002 represents the maximum plastic component of strain in the copper traces 303 in FIG. 3, so the figure of merit for any design will be the residual plastic strain when the moment load is released, or brought to zero, or after load step #4. Two examples are provided.

Figure 11:
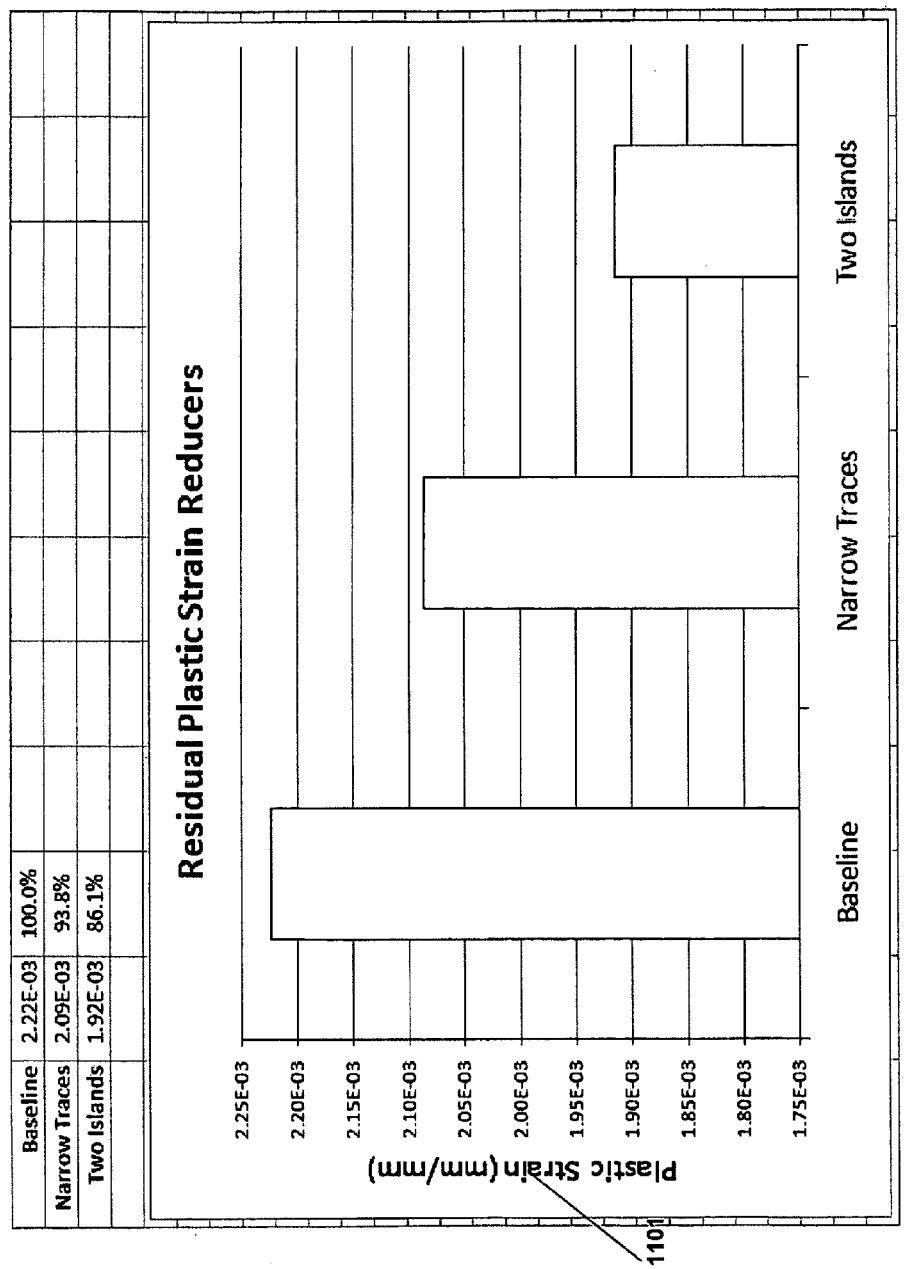
FIG. 11 illustrates various FEM results for residual plastic strain after forming.

FIG. 11 summarizes the various FEM results for copper residual plastic strain after forming. The y-axis 1101 is the same as described in FIG. 10.

Figure 12:
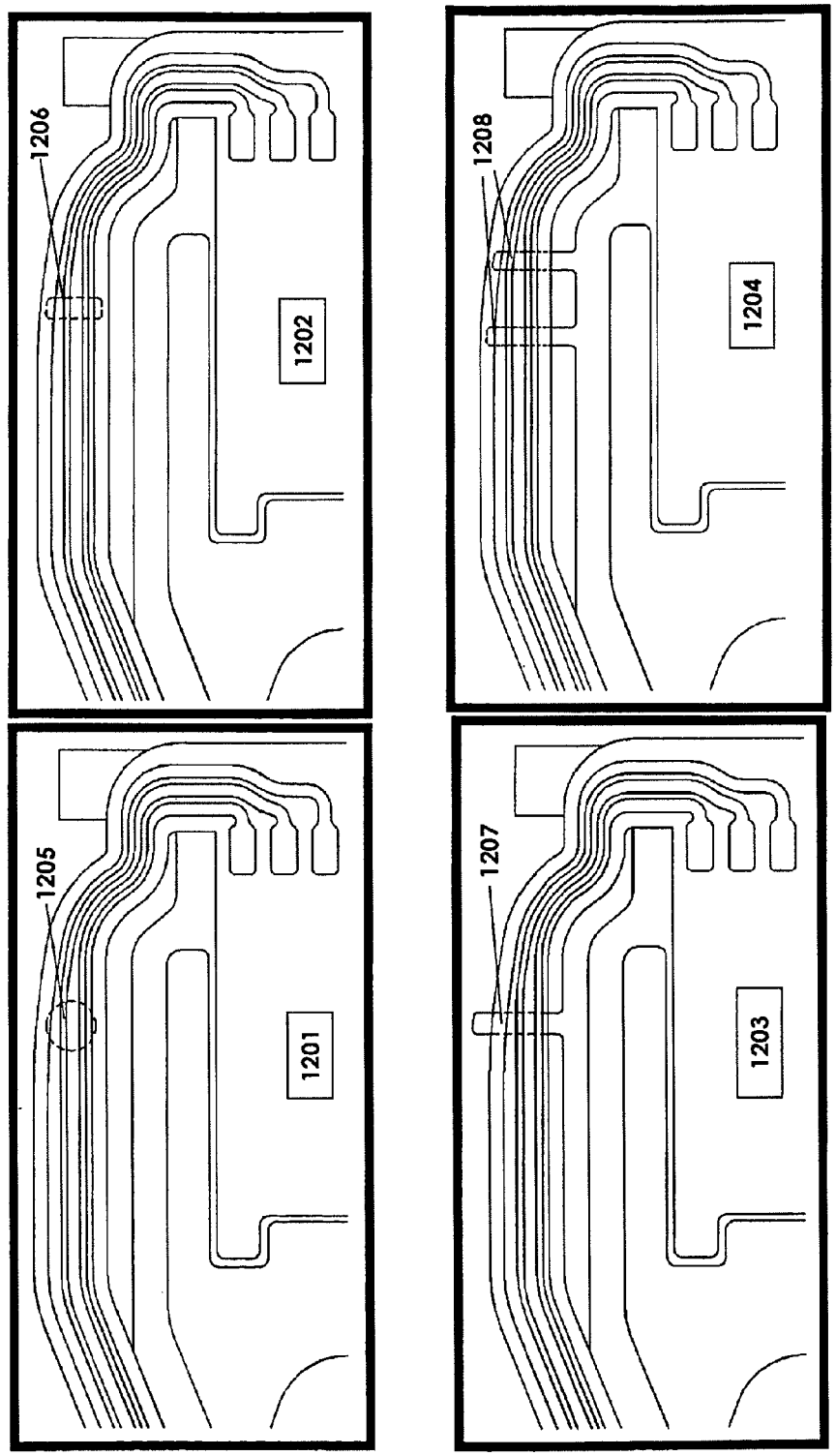
FIG. 12 illustrates various embodiments of the present invention in regard to the SST support strut member and its location, as compared to the conventional technology.

FIG. 12 illustrates various embodiments of the present invention in regards to the SST support member and its location. Configuration 1201 illustrates an embodiment of this invention with one circular SST support member 1205 strategically located under the traces high strain region in order to reduce the residual plastic strain component. Configuration 1202 illustrates an embodiment of this invention with one rectangular SST support member 1206 strategically located under the copper traces of the high strain region in order to reduce the residual plastic strain component. Configuration 1203 illustrates an embodiment of this invention with one rectangular SST support member 1207 strategically located under the traces high strain region in order to reduce the residual plastic strain component. This rectangular island connects to the inner SST strut rather than being an isolated island as in 1202. Configuration 1204 illustrates an embodiment of this invention with two rectangular SST support members 1208 strategically located to straddle the traces high strain region in order to reduce the residual plastic strain component. These rectangular islands connect to the inner SST strut rather than being isolated. An obvious variation of this configuration is to have one island connect to strut and the other not connect, and vice versa.

As it would be appreciated by those of skill in the art, other implementations of the invention will be apparent from consideration of the specification and practice of the invention disclosed herein. Various aspects and/or components of the described embodiments may be used singly or in any combination in the structures for reducing residual stress in gimbal trace circuits. It is intended that the specification and examples be considered as exemplary only, with a true scope and spirit of the invention being indicated by the following claims and their equivalents.

What is claimed is:
1. A hard drive (HDD) gimbal trace circuit characterized in reduced magnitude of the residual stress or residual plastic strain, the trace circuit comprising:
  a stainless steel gimbal strut (SGST) configured to support a transducer and configured to nullify a natural pitch angle of a flexure from mechanical-coarse adjustment of the SGST;

a plurality of traces forming a trace structure, and being plastically deformed at a high strain region from the mechanical-coarse adjustment of the SGST;

a first stress suppressor comprising a first protrusion being at least partially disposed under the high strain region, and a second stress suppressor comprising a second protrusion being at least partially disposed under the high strain region, wherein the SGST has an edge disposed on the transducer side so as to be spaced apart with an air gap from the trace structure in the high strain region, the edge extending so as to be substantially parallel to the plurality of traces in the high strain region, each of the first protrusion and the second protrusion extends from the edge in an orthogonal direction to an extending direction of the trace structure in the high strain region so as to extend across the plurality of traces in the high strain region without bending, the first protrusion and the second protrusion are disposed side by side in the extending direction of the plurality of traces, each of the first protrusion and the second protrusion comprises:

a proximate end which contacts the edge of the SGST on a first side of the plurality of traces;

a distal end which is distal to the edge, is located outside of a second side of the plurality of traces, and is parallel to the proximate end;

two equally-sized parallel sides which extend from the distal end to the proximate end, and only the first protrusion and the second protrusion are disposed under the plurality of traces in the high strain region.

2. The hard drive (HDD) gimbal trace circuit of claim 1, wherein the first protrusion has a rectangular shape.

3. The hard drive (HDD) gimbal trace circuit of claim 1, wherein the first protrusion and the second protrusion are configured to nullify a pitch angle relaxation of the high strain region.

4. The hard drive (HDD) gimbal trace circuit of claim 1, wherein each of the first protrusion and the second protrusion further comprises a middle portion which is disposed between the proximate end and the distal end and extends under the high strain region of the plurality of traces, wherein the extending direction of the plurality of traces in the high strain region is orthogonal to an extending direction of the middle portion.

5. The hard drive (HDD) gimbal trace circuit of claim 1, wherein at least one of the first protrusion and the second protrusion extends unitarily from the SGST.

6. The hard drive (HDD) gimbal trace circuit of claim 5, wherein the proximate end of at least one of the first protrusion and the second protrusion is exposed from under the plurality of traces on the first side of the plurality of traces.

7. The hard drive (HDD) gimbal trace circuit of claim 1, wherein the plurality of traces of the trace structure comprises traces which extend continuously.

8. The hard drive (HDD) gimbal trace circuit of claim 1, wherein the trace structure comprises:

a proximate end which extends outwardly and is substantially parallel to the SGST; and a distal end which extends outwardly and is substantially parallel to the SGST, and each of the first protrusion and the second protrusion extend from the edge of the SGST toward the distal end of the trace structure under the plurality of traces.

9. The hard drive (HDD) gimbal trace circuit of claim 1, wherein the edge of the SGST extends along a longitudinal direction of the hard drive (HDD) gimbal trace circuit.

* * * * *